Sept. 28, 1965  F. H. PRESTWOOD  3,209,349
TARGET-CARRIER AIRCRAFT PROTECTIVE SYSTEM
Filed Feb. 25, 1960  2 Sheets-Sheet 1

INVENTOR.
FRANKLIN H. PRESTWOOD
BY
ATTORNEY
AGENT

United States Patent Office 3,209,349
Patented Sept. 28, 1965

3,209,349
TARGET-CARRIER AIRCRAFT PROTECTIVE SYSTEM
Franklin H. Prestwood, Valparaiso, Fla., assignor to the United States of America as represented by the Secretary of the Air Force
Filed Feb. 25, 1960, Ser. No. 11,105
2 Claims. (Cl. 343—6.5)
(Granted under Title 35, U.S. Code (1952), sec. 266)

The invention described herein may be manufactured and used by or for the United States Government for governmental purposes without payment to me of any royalty thereon.

The purpose of this invention is to provide a safety system to prevent the target-carrier aircraft from being fired upon by the attacking aircraft during aerial target practice.

In the defense against high speed jet or rocket powered missiles, the defending aircraft now depend upon radar fire control systems to automatically acquire the target and to bring the armament of the attacking aircraft to bear thereon. In the testing and evaluation of such fire control systems under simulated use conditions, it is customary to use a jet or rocket powered target tethered to a target-carrier aircraft by cable of sufficient length to provide relative safety to the aircraft. However, due to the great speeds and ranges and, due to the poor conditions of visibility often encountered, it is possible for the fire control radar to lock onto the target-carrier aircraft with the result that the attacking aircraft's fire is directed against the latter.

In order to prevent this possibility, the target-carrier aircraft in accordance with the invention is equipped with a radar receiver capable of receiving the fire control signals of the attacking aircraft. There is also provided a local signal generator for supplying a test signal to the input of the radar receiver at a level below that of the weakest radar fire control signal received. The target-carrier aircraft is also equipped with a transmitter operating at a frequency different from the fire control frequency and having a keying circuit controlled from the output of the radar receiver. The arrangement is such that the output of the radar receiver due to the low level test signal will close the keying relay of the transmitter with the result that the transmitter radiates continuously in the absence of an external input signal to the radar receiver. Additional apparatus responsive to the output of the radar receiver is provided for deenergizing the keying relay of the transmitter whenever the radar receiver output rises to a predetermined level as occurs when the attacking aircraft fire control signals are received by the radar receiver.

The attack aircraft is equipped with a receiver operating on the same frequency as the target-carrier aircraft transmitter. The output of this receiver is used to control the arming relay of the radar fire control apparatus, an output from the receiver closing the relay and arming the fire control system.

In effect, therefore, the attacking aircraft receives an arming signal from the target-carrier aircraft and this signal is interrupted whenever the target-carrier aircraft receives a radar signal, such as would occur should the attacking aircraft fire control system lock onto the target-carrier aircraft. This system inherently fails safe since component failure in the transmitter of the target-carrier aircraft or the receiver of the attack aircraft sufficient to destroy the receiver output will disarm the fire control system and since component failure in the radar receiver of the target-carrier aircraft will block the locally generated test signal and thus deenergize the keying relay of the transmitter.

A more detailed description of the invention will be given with reference to the accompanying drawings, in which.

Figures 1, 2:
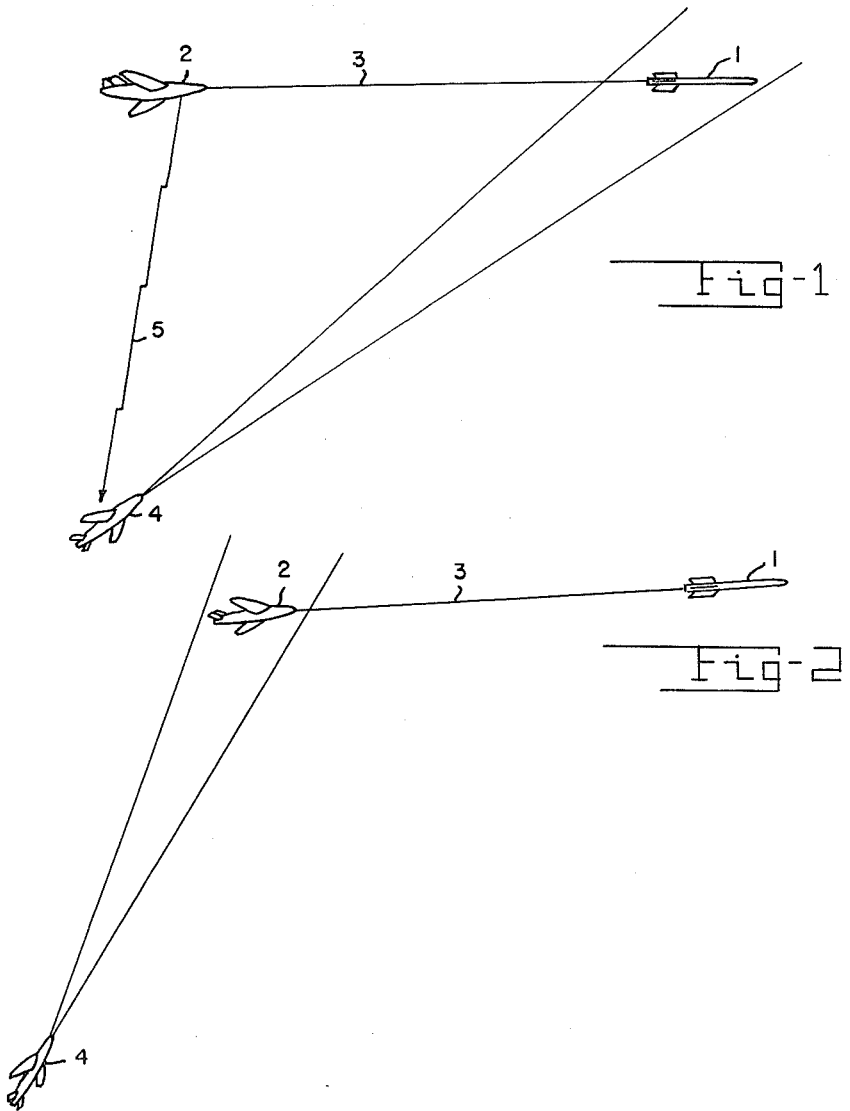
FIG. 1 represents the situation where the fire control radar of the attacking aircraft is properly tracking the target.
FIG. 2 represents the situation where the fire control radar of the attacking aircraft is locked onto the target carrier aircraft.

Referring to FIG. 1, a target 1, which may be rocket powered, is tethered to a carrier aircraft 2 by a long cable 3. The fire control radar of the attacking aircraft 4, in this case, is properly locked onto the target and the target-carrier aircraft 2 is transmitting an arming signal 5 to the attacking aircraft.

In FIGURE 2 the fire control radar of the attacking plane 4 is shown tracking the target carrier aircraft 2 rather than the target 1. As explained briefly above and in more detail later, this causes the arming signal 5 to be cancelled and the fire control apparatus of the attacking aircraft to be disarmed.

Figure 3:
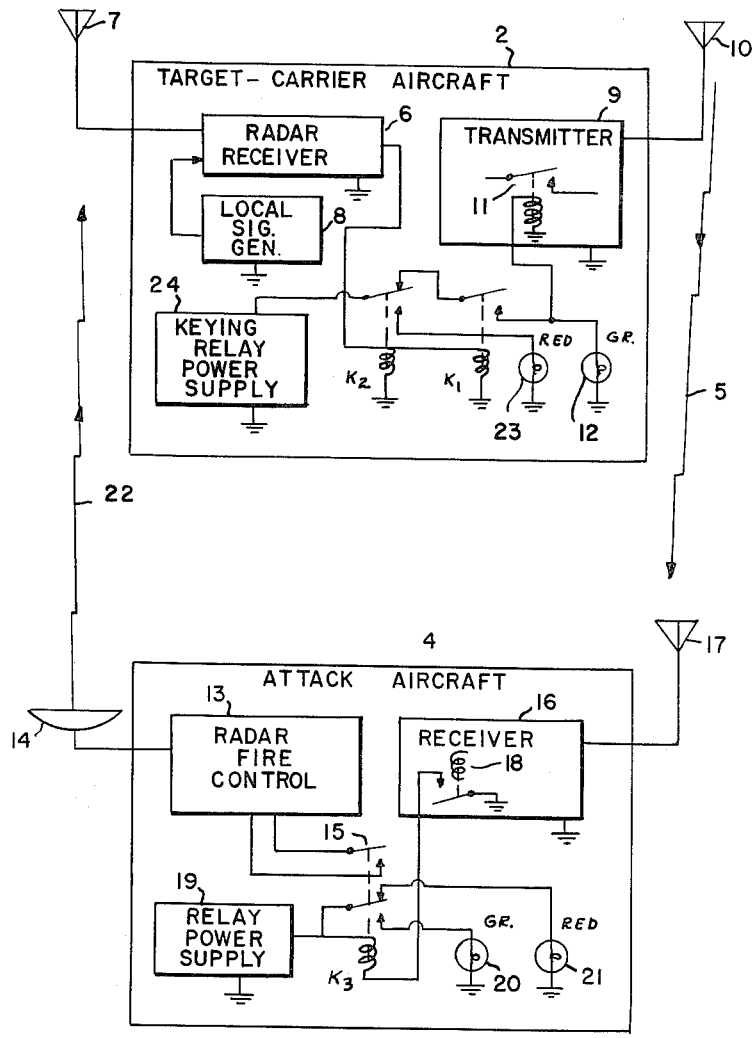
FIG. 3 is a schematic diagram of the protective system in accordance with the invention.

The details of the protective system, in accordance with the invention, are shown in FIG. 3. The target-carrier aircraft 2 is provided with a radar receiver 6 having antenna 7 and the output of local signal generator 8 connected to its input. The output of the radar receiver is utilized to control relays K1 and K2, the actuating coils of which are shown connected parallel. The output of receiver 6 may be in any form proportional to the receiver input and suitable to the actuation of relays K1 and K2. For example, it may be a direct current derived through rectification of the received carrier and suitable amplification.

Local signal generator 8 supplies a continuous input to the radar receiver on a lower level than that of the signal produced at the radar receiver input by the lowest level fire control radar signal. Relay K1 is designed to be operated at the low output level produced by this test signal. Relay K2 is designed to operate only at the higher output levels produced by a received radar signal. The receiver 6 may be of the broad band crystal video type with a sensitivity of approximately 40 dbm (below 1 milliwatt) and operating in the fire control band. The antenna 7 may be a simple omnidirectional omniphase antenna.

The transmitter 9 located in the target-carrier aircraft has an antenna 10 and is controlled by keying relay 11. This transmitter may operate on a suitable frequency in the UHF or VHF communications spectrum. In the absence of a radar signal at antenna 7, the only signal applied to the input of radar receiver 6 is the test signal from the local signal generator 8. The resulting output from the receiver due to the test signal, as previously explained, is sufficient to actuate relay K1, applying voltage from the keying relay power supply 24 through the normally closed contacts of relay K2 to the keying relay 11 of transmitter 9. Under this condition, therefore, the transmitter radiates continuously from antenna 10. Actuation of relay K1 also energizes green indicator lamp 12, indicating a safe condition to the pilot of the target-carrier aircraft.

Referring to the block 4 representing the attack aircraft in FIG. 3, block 13 together with directional antenna 14 represent all the apparatus for automatically bringing the armament of the attack aircraft to bear on the target through radar means. This apparatus may be any of the known types for this purpose. This apparatus cannot fire the armament unless arming contacts 15 of relay K3, which contacts are in the armament firing circuit of the fire control apparatus, are closed. The attack aircraft also contains a receiver 16, tuned to the frequency of transmitter 9 of the target-carrier aircraft, having its input connected to antenna 17. The receiver may also contain a sensitive relay 18, the contacts of which are closed by an output from the receiver. Therefore, when receiver 16 is receiving a signal from transmitter 9, relay 18 is energized which completes a circuit from relay power supply 19 through the coil of relay K3 to ground, thus energizing K3. This closes contacts 15 arming the fire control apparatus. Actuation of K3 also energizes indicator light 20 indicating a safe condition. In the absence of an output from receiver 16, relay K3 is deenergized, contacts 15 are opened disarming the fire control system and red indicator light 21 is energized indicating an unsafe condition.

Summarizing the operation of the protective system, whenever the position of the target-carrier aircraft is outside the beam of the radar fire control antenna 14, the only output of radar receiver 6 is the low level output due to the test signal produced by local signal generator 8 and relay K1 only is actuated. Under this condition, keying relay 11 is energized and arming signal 5 is radiated continuously from antenna 10. Also, green indicator light 12 is energized indicating a safe condition to the target-carrier aircraft pilot. The presence of signal 5 causes relay 18 of receiver 16 to be closed energizing relay K3 and closing contacts 15, thus arming the fire control apparatus. Also, green indicator light 20 is energized indicating a safe condition to the pilot of the attack aircraft. Should the beam of antenna 14 be directed toward the target-carrier aircraft 2, the radar signal 22 would be received by antenna 7 and the resulting higher level output from radar receiver 6 would cause relay K2 to be energized and the circuit to keying relay 11 broken. This stops the radiation of arming signal 5 by transmitter 9. Also, red indicator light 23 is energized indicating an unsafe condition to the pilot of the target-carrier aircraft. The cancellation of arming signal 5 causes relay 18 in receiver 16 to open causing relay K3 to be deenergized and contacts 15 to open, thus disarming the fire control apparatus. Also red indicator light 21 is energized indicating an unsafe condition to the pilot of the attack aircraft.

The protective system is so designed that failure of any of its components will cause a disarming of the fire control apparatus. Should signal generator 8 of radar receiver 6 fail, the low level output of receiver 6, due to the test signal, would disappear allowing relay K1 to become deenergized. This would cancel arming signal 5 through deenergization of keying relay 11 of the transmitter 9. Also failure of a component in transmitter 9 cancelling signal 5 or failure of receiver 16 would cause relay 18 to open and remain open deenergizing relay K3 and disarming the fire control apparatus. Therefore any failure in this system would result either in the cancellation of arming signal 5 or the cancellation of output for receiver 16, both conditions acting to disarm the radar fire control apparatus.

The target-carrier aircraft protective system may be used with any number of attacking aircraft. In this case the receiver 16 in each attacking aircraft is tuned to the transmitter 9 of the target-carrier aircraft. Should a radar signal from any one or more of the attacking aircraft be received by antenna 7 of the target-carrier aircraft, the arming signal 5 would be cancelled and the fire control systems of the attacking aircraft disarmed.

I claim:

1. A safety system for use during aerial target practice to protect a target-carrier aircraft from the fire of an attack aircraft equipped with radar fire control apparatus having an armament firing circuit, said system comprising: a radar receiver on said target-carrier aircraft capable of receiving radar fire control signals emitted by said attack aircraft; a transmitter on said target-carrier aircraft having an output frequency different from the radar fire control signal frequency; a local signal generator on said target-carrier aircraft coupled to the input of said radar receiver for supplying a test signal at a level below the range of received radar signal levels; means responsive to an output from said radar receiver of the level produced by said test signal for keying said transmitter; means coupled to the output of said radar receiver and operative when its output level becomes at least as high as the output level produced by the weakest received radar fire control signal to unkey said transmitter; a receiver in said attack aircraft capable of receiving the signal radiated by said transmitter; normally inoperative arming means in the armament firing circuit of said fire control apparatus; and means responsive to an output from said attack aircraft receiver for operating said arming means.

2. A safety system for use during aerial target practice to protect a target-carrier aircraft from the fire of an attack aircraft equipped with radar fire control apparatus having an armament firing circuit, said system comprising: a radar receiver on said target-carrier aircraft capable of receiving radar fire control signals emitted by said attack aircraft; a transmitter on said target-carrier aircraft having an output frequency different from the radar fire control signal frequency; a local signal generator on said target-carrier aircraft coupled to the input of said radar receiver for supplying a test signal at a level below the range of received radar signal levels; means responsive to an output from said radar receiver of the level produced by said test signal for keying said transmitter and for giving a visual indication of a safe condition; means coupled to the output of said radar receiver and operative when its output level becomes at least as high as the output level produced by the weakest received radar fire control signal to unkey said transmitter and to give a visual indication of an unsafe condition; a receiver in said attack aircraft capable of receiving the signal radiated by said transmitter; means operative in the absence of an output from said attack aircraft receiver to give a visual indication of an unsafe condition; normally inoperative arming means in the armament firing circuit of said fire control apparatus; and means responsive to an output from said attack aircraft receiver for operating said arming means and for giving a visual indication of a safe condition.

References Cited by the Examiner
UNITED STATES PATENTS 2,472,136    6/49    Whitlock _____ 343—7
2,845,619    7/58    Rawlins _____ 343—7

LEWIS H. MYERS, *Primary Examiner.*

FREDERICK M. STRADER, CHESTER L. JUSTUS,
*Examiners.*